United States Patent
Ferschneider et al.

(10) Patent No.: US 6,284,134 B1
(45) Date of Patent: Sep. 4, 2001

(54) DEVICE FOR IMPROVING THE PURITY OF A PRODUCT IN A SIMULATED MOVING BED THAT COMPRISES FORCED FLUID RECIRCULATION

(75) Inventors: Gilles Ferschneider, Saint Symphorien D'Ozon; Roland Huin, Chaponost; Jean-Christophe Viguie, Saint Symphorien D'Ozon; Dominique Humeau, Vienne, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/496,877

(22) Filed: Feb. 2, 2000

Related U.S. Application Data

(62) Division of application No. 09/299,586, filed on Apr. 27, 1999, now Pat. No. 6,146,537.

(30) Foreign Application Priority Data

Apr. 27, 1998 (FR) .................................................. 98 05355

(51) Int. Cl.[7] .................................................. B01D 15/08
(52) U.S. Cl. ...................................... 210/198.2; 210/659
(58) Field of Search .................................. 210/635, 656, 210/659, 662, 198.2

(56) References Cited

U.S. PATENT DOCUMENTS

| | | | |
|---|---|---|---|
| 2,985,589 | 5/1961 | Broughton et al. | ..................... 210/34 |
| 3,214,247 | * 10/1965 | Broughton | .............................. 23/288 |
| 3,268,605 | 8/1966 | Boyd, Jr. | ............................... 260/666 |
| 3,789,989 | * 2/1974 | Carson | .................................. 210/284 |
| 4,387,292 | * 6/1983 | Vitaloni | ................................. 219/267 |
| 5,755,960 | * 5/1998 | Callebert | ........................... 210/198.2 |
| 5,762,806 | * 6/1998 | Hotier | ................................... 210/659 |
| 5,846,411 | * 12/1998 | Harter | ............................... 210/198.2 |
| 5,882,523 | * 6/1999 | Hotier | .................................. 210/659 |
| 5,972,224 | * 10/1999 | Hotier | .................................. 210/659 |

FOREIGN PATENT DOCUMENTS 0 769 316    4/1997   (EP) ..................................... 210/659

* cited by examiner

Primary Examiner—Ernest G. Therkorn
(74) Attorney, Agent, or Firm—Millen, White, Zelano & Branigan, P.C.

(57) ABSTRACT

The device comprises at least one column 1 that is filled with a number of beds $A_n$, whereby each bed $A_i$ is separated from the next bed $A_{i+1}$ by a fluid distributor plate $P_i$. Each plate is divided into a number of sectors $P_{10}$, and $P_{11}$, and each sector comprises at least two fluid distribution chambers $CH_i$ and $CH_j$. Each chamber of the plate is connected to a transfer line $LT_i$ and $LT_j$ to the outside. Transfer line $LT_i$, which is associated with chambers $CH_i$ of a distributor plate, is connected to transfer line $LT_j$, which is associated with chambers $CH_j$ of the same plate, via a bypass line $L_{i,j}$. The latter comprises means 14, 15, 16, and 17 for controlling and adjusting the flow rate of fluid that circulates there, such that each distribution chamber $CH_i$ is flushed by a fluid that is obtained from chamber $CH_j$ and that has approximately the same composition as that of the fluid that circulates through distributor plate $P_i$ at each of the chambers.

12 Claims, 4 Drawing Sheets

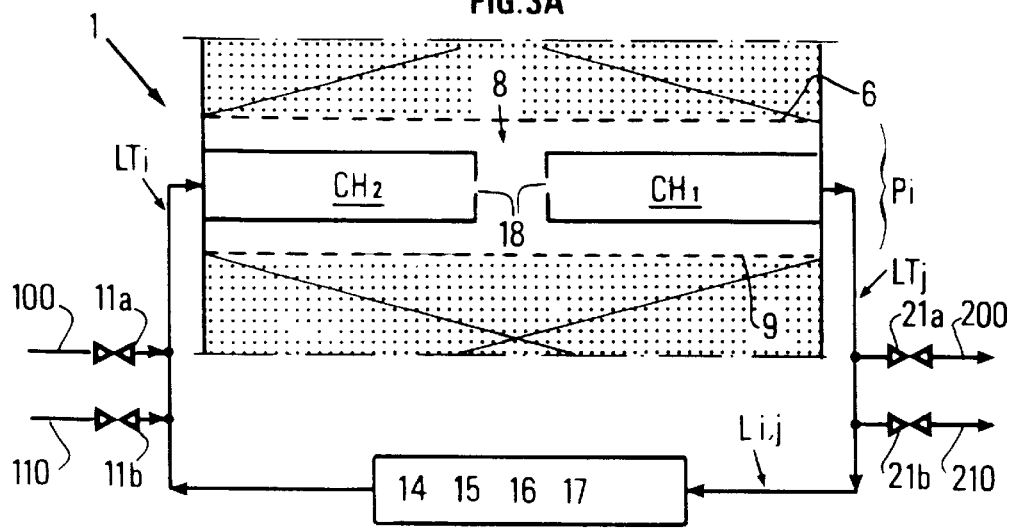
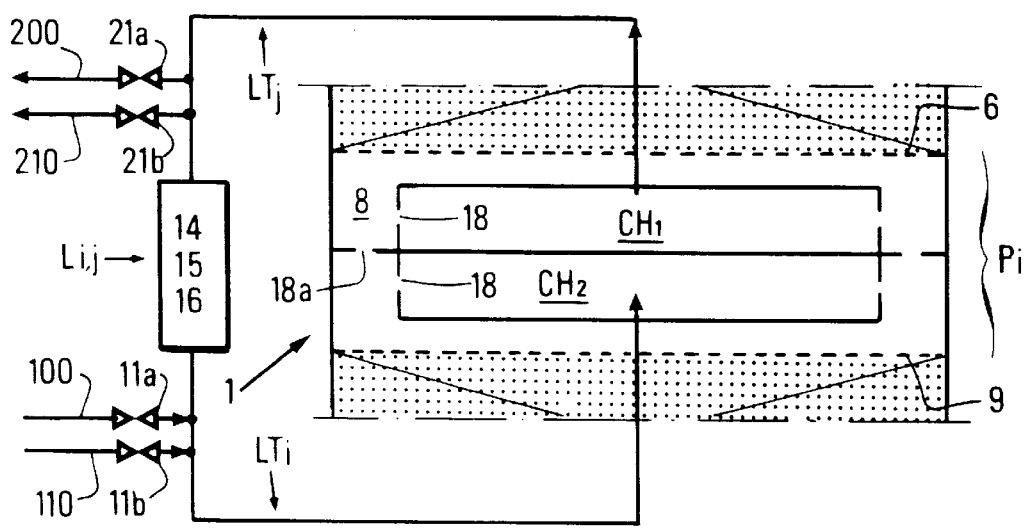

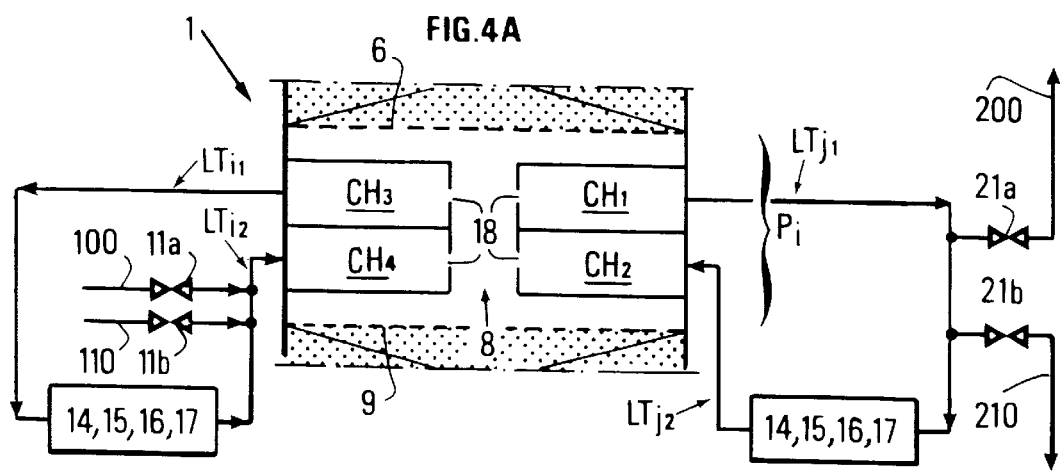
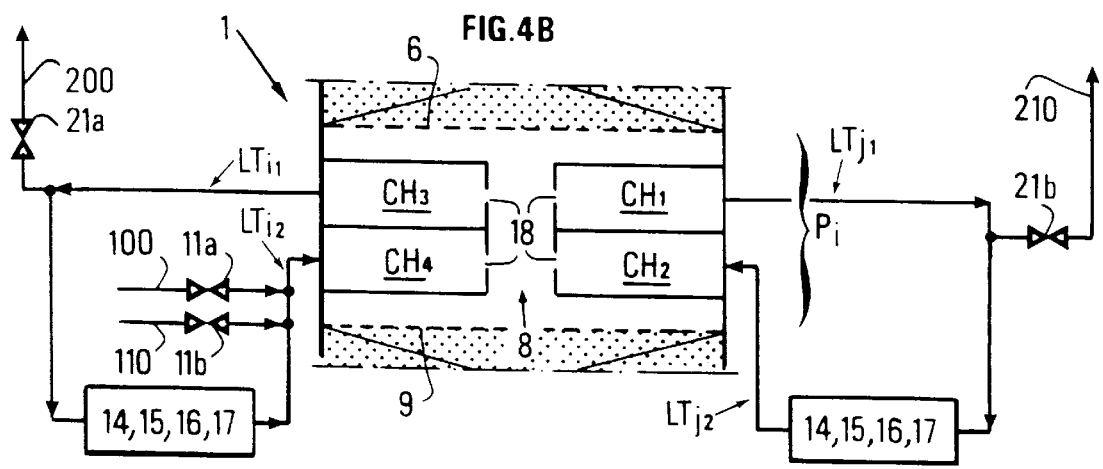
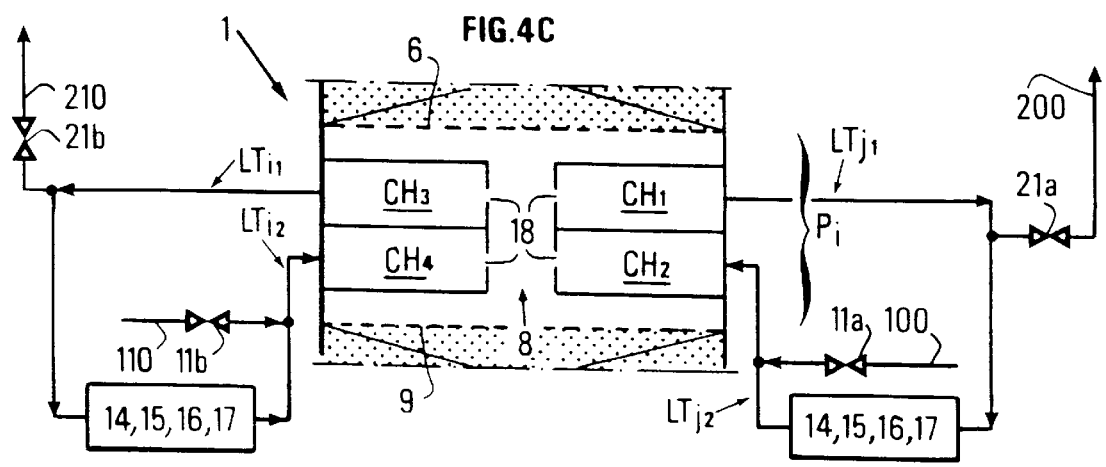

DEVICE FOR IMPROVING THE PURITY OF A PRODUCT IN A SIMULATED MOVING BED THAT COMPRISES FORCED FLUID RECIRCULATION

This is a division of application Ser. No. 09/299,586 filed Apr. 27, 1999, now U.S. Pat. No. 6,146,537.

FIELD OF THE INVENTION

The invention relates to a device for improving the purity of at least one component in a mixture that circulates through a solid adsorbent or a solid catalyst, as well as the process that makes its operation possible.

The invention particularly relates to a process for separation by adsorption or ion exchange, for example, in a simulated moving bed, of at least one compound that is contained in this mixture in order to obtain this compound in very pure form. It applies, for example, to the separation of hydrocarbon mixtures, for example, mixtures that contain linear compounds and branched compounds, mixtures that contain aromatic compounds that are substituted at different positions, such as a mixture that contains 1-methylnaphthalene and 2-methylnaphthalene or saccharide mixtures, for example a mixture that contains fructose and dextrose.

More generally, the invention relates to the separation of at least one isomer in a mixture of components that contains at least one aryl group to which at least one alkyl group is attached.

The invention relates more particularly to a process for separation in a simulated moving bed of the paraxylene that is contained in a mixture of xylenes and ethylbenzene, for the purpose of synthesizing terephthalic acid, an intermediate petrochemical in the production of textiles.

BACKGROUND OF THE INVENTION

The technological background is illustrated by U.S. Pat. No. 3,268,605, which describes a process for controlling the composition of the fluids in a simulated moving bed.

The reactors or adsorbers that are used now are increasingly large in order to meet a rising demand for the product in question.

Furthermore, the desired product should reach a purity that most often exceeds 99.5%, which is not a priori compatible with the volume of the feedstock that is to be treated and therefore with very large reactor capacities.

The technological background that illustrates the implementation of an adsorption device with simulated counter-current is described in, for example, U.S. Pat. No. 2,985,589. This device comprises at least one cylindrical column that contains a solid mass that is cylindrical overall and is essentially annular in cross-section. A main fluid that is introduced by a pump flows through the solid bed along the central axis of the column according to a flow that we wish to describe as a piston-type flow (plug flow). In other words, the fluid should have a composition and flow front that are uniform at all points of the section of the column.

A device such as the one that is described in U.S. Pat. Nos. 3,214,247 and 4,387,292, which are incorporated as references, makes it possible to achieve this goal. This device generally comprises a number of beds of an adsorbent, fed by a number of distributor plates, whereby each bed is supported by an upper grid that is approximately perpendicular to the axis of the reactor and makes it possible for the fluid to flow. Each plate is divided into sectors, and each distributor plate segment comprises two deflectors that are non-perforated, flat, or tapered overall (of variable thickness) arranged on the same horizontal plane, between which a circulation space for the fluid is placed. A lower grid under the deflectors makes it possible to distribute the fluid uniformly in the lower adsorbent bed.

At each distribution plate, at least four transfer lines for secondary fluids (feedstock injection line, desorbent injection line, draw-off line of an extract, and draw-off line of a raffinate) that contain a set of valves are connected to means of switching this set of valves.

The injections and draw-offs of these fluids are carried out between some beds that define zones, and over the length of time that is called period T the introduction and draw-off points that delimit the zones of between-bed interval ($c_k$) and ($c_{k+1}$) are shifted to between-bed interval ($c_{k+1}$) and ($c_{k+2}$). Cycle time Tc is defined as being the length of time that separates two consecutive injections of the same fluid onto same plate $P_i$. Length of time T can vary from one bed to the next.

A recycling pump recycles the fluid from the low end of the column to the top end of the column.

The secondary fluids (feedstock or desorbent) are introduced or drawn off (extract, raffinate) into or from the circulation space via an introduction or draw-off chamber that is pierced with holes.

Each distributor plate can be divided into sectors. According to U.S. Pat. No. 3,789,989, each plate sector, delimited by radial walls, comprises a chamber for the introduction or draw-off of the secondary fluid.

In the case where the distributor plate of each sector comprises only a single chamber, each chamber of a given sector is connected via a tube to a single feed line or draw-off line that is connected to the outside of the column.

According to Patent Application EP-A-769316, each secondary fluid is introduced or drawn off via its own introduction or draw-off chamber that has a number of orifices opposite the circulation space. The upper and lower walls of these chambers constitute the deflectors that are mentioned above. Therefore, when the distributor plate of each sector comprises several chambers, each chamber of a bed sector is connected via a tube to a line that is intended to receive only a single fluid or to feed the corresponding chamber with desorbent or with feedstock or to draw off the raffinate or the extract from the appropriate chamber. Thus, for example, if each sector comprises four chambers, one intended for feedstock, the second for desorbent, the third for raffinate, and the fourth for extract, the CF chamber of the given sector that receives feedstock F will be connected to a line that receives all of the pipes of different chambers CF associated with the same adsorbent bed.

In a paraxylene separation unit that operates in a simulated moving bed and that comprises two adsorbers that are arranged in a series of a dozen sieve beds each, deformation (or drag) of the longitudinal concentration profiles, which is reflected by deficient performance relative to the desired ideal performance, has been noted.

In particular, the drag of the impurity concentration at the extract draw-off level is reflected by a significant reduction in the purity of the extract (less than 99%) compared to the desired purity (greater than 99.5%). An analysis of the problem, carried out on the separation unit, showed that these deformations (or drags) of the longitudinal concentration profiles were due to parasitic circulations through each of the distribution chambers that are arranged on the sectors of each plate during periods when there is neither introduction nor draw-off of fluid through the chamber in question. This is in particular a wow, i.e., a material exchange caused by turbulence at the orifices of the distribution chambers between the main fluid that circulates in the circulation space and the fluid that is contained in the chambers. This phenomenon is known for producing small drags. It is also especially recirculation of a distribution chamber of a plate sector toward the similar chamber of another sector of the same plate, via the coupling pipe that connects these chambers to one another and to the transfer line to the outside of the adsorber.

This recirculation is caused by small pressure differences that exist between the sectors of the same plate. In theory, this pressure should be the same everywhere on the same plate. In practice, small differences exist because of various imperfections such as the imperfections of flow of the main fluid through the adsorbent beds, and this induces, during the periods where there is neither introduction nor draw-off of secondary fluid in a chamber, the recirculation of a portion of the main fluid that is withdrawn at the circulation space of a sector where the pressure is higher to the circulation space of a sector where the pressure is lower, whereby this occurs via the orifices of the chambers in question. The portion of the main fluid that is recirculated enters one of the chambers by passing through the orifices of the chamber that is affected and that belongs to the higher-pressure sector. This portion of fluid then advances toward the similar chamber that belongs to the lower-pressure sector via the coupling pipe that connects these chambers to one another. Finally, this fluid portion rejoins the main fluid in the circulation space of the lower-pressure sector by passing through the orifices of the chamber of this sector.

The recirculation flow rate between two sectors of the same plate is a function of the pressure differences that exist between these two sectors, as well as the sizes of the orifices of the chambers of the sectors that are affected. The dwell time of the fluid that thus recirculates from one chamber of a sector to the corresponding chamber of another sector is itself a function of the volume of the exit and arrival chambers, the pipe volume that connects them, and the recirculation flow rate between these chambers. If the plate comprises multiple sectors, there will be a combined general recirculation from the sectors where the pressure is the highest toward the sectors where the pressure is the least high, whereby this recirculation takes place with a mean overall dwell time TR.

In this unit that operates on a simulated moving bed, the composition of the main fluid at the level of a plate changes constantly as a function of time. This is because of the advance of the longitudinal concentration profile, which moves under the action of the circulation of the main fluid. Taking into account the parasitic recirculation that is observed, it follows that on a plate taken at a given instant there arrive, on the one hand, the main fluid that has a given composition and, on the other hand, the portion of the recirculated main fluid that is recirculated from a portion of the sectors toward the other sectors of this same plate that has a composition that corresponds to that which the main fluid had a moment before, whereby the time shift is equal to dwell time TR of the portion of recirculated fluid. Everything therefore happens as if a portion of the main fluid came to each plate with a certain delay, which is equal to dwell time TR. The mixing of this portion of fluid that is recirculated with a delay with the main fluid modifies the overall composition of the combined fluid and therefore causes a systematic retromixing at each plate. This induces a deformation, or drag, of the longitudinal concentration profiles and is reflected by a loss in performance as the reduction in purity of the extract that can reach, for example, up to a point.

SUMMARY OF THE INVENTION

The object of the invention is to eliminate the drawbacks of the embodiments according to the prior art. Another object is to improve the purity of the desired product, in particular in the case of reactors or adsorbers with very large diameters.

More specifically, the invention relates to a process for chromatographic separation of a feedstock in a simulated moving bed device that comprises at least one column that is filled with an adsorbent, whereby the column comprises a number of adsorbent beds (A1 to An) and a fluid distributor plate between each bed, whereby each distributor plate is divided into a number of sectors, whereby each distributor plate sector comprises at least two distribution chambers ($CH_i$, $CH_j$) that are pierced with orifices and a fluid circulation space near said orifices of said chambers, whereby each chamber of the plate is connected to a transfer line that extends between said chamber and a point that is located outside of the column; during at least a fraction of a period T of the cycle and on at least one of the plates of the column, injection of the feedstock, draw-off of a raffinate, injection of desorbent, and draw-off of extract into and from a distribution chamber take place, whereby the process is characterized in that a volume of the fluid that circulates in the column in a bypass line that connects all of chambers $CH_i$ of distributor plate $P_i$ to all of chambers $CH_j$ of this same distributor plate is circulated at a suitable flow rate for at least a fraction of period T of the cycle and on at least one of the plates of the column, whereby the flow rate of fluid that circulates in the bypass line is at least equal to the volume of all of chambers $CH_i$ and $CH_j$ and lines through which the transfer of the fluid from chambers $CH_i$ and $CH_j$ that comprise the bypass line, divided by said fraction of a period, takes place. It is possible to circulate said fluid in the bypass line at a flow rate that is equal to 1 to 5 times said volume and at most to 10 times said volume, divided by said fraction of a period.

In a preferred way, it is possible to circulate a suitable flow of fluid continuously, which is then calculated based on the period of the cycle.

According to a first special embodiment of the invention, the flow of fluid that circulates in the bypass line will be zero when injection or draw-off takes place on the plate in question.

According to another special embodiment of the invention, the flow of fluid that circulates in the bypass line will be maintained even when injection or draw-off takes place on the plate in question.

By operating according to the process, any stagnation of residual fluid in the distribution chambers is avoided. The distribution chamber from which the fluid (the so-called pump-around main fluid) is drawn experiences the circulation of a fluid whose composition is essentially that of the fluid which at the same time passes through the circulation space into the distributor plate that connects one adsorbent bed to another adsorbent bed.

Likewise, the circulation chamber in which the fluid is introduced via the bypass line experiences the circulation of a fluid whose composition is essentially that of the fluid which passes through the so-called circulation space at the same instant.

Under these conditions, it has been observed that a very advantageous purity was obtained in the desired product, for example, paraxylene (very often more than 99.8%) and a yield that is usually greater than 95%, in a simple way and with the elimination of the perturbation that affects the concentration profile flowing into the adsorbent beds.

According to a special implementation, means for controlling and adjusting the flow rate of fluid that circulates in the chambers and the bypass line can be placed on the latter.

The latter can consist of a line that is calibrated as a function of the volumes involved and the period of circulation of the fluid to obtain the appropriate flow rate.

According to another special implementation, a nonreturn valve can be arranged on the bypass line downstream from said means to control and adjust the fluid flow rate and prevents any liquid from returning upstream.

A pump or a circulator that connects chambers $CH_i$ to chambers $CH_j$ makes it possible in general for the fluid to circulate in this line. The scope of this invention would not be exceeded if any other possible means were used that makes it possible for the fluid to circulate from one chamber to the next such as, for example, a means that makes it possible to create an adequate pressure difference between the two chambers. As a means that makes it possible to create a pressure difference, it is possible to consider, for example, a passage section restriction at the circulation space.

The distributor plate can comprise two, three, or four distribution chambers, advantageously two or four chambers, per sector.

In the case where the distributor plate comprises two chambers per sector, it is possible to draw off the fluid from the first chambers of a distributor plate $P_i$ to introduce it, via the bypass line, into the second chambers of said distributor plate $P_i$. During the period when the extract or the raffinate is drawn off, it is possible to draw off extract or raffinate from the first chambers of plate $P_i$, and it is possible to cancel out the flow rate of the bypass line that feeds the second chambers of plate $P_i$.

According to another variant of a distributor plate with two chambers per sector, a first is intended to receive a draw-off of extract, and a second is intended to receive an introduction of feedstock or desorbent or a draw-off of raffinate. It is possible to draw off the fluid from the first chambers of a distributor plate $P_i$ to introduce it via the bypass line into the second chambers of said distributor plate $P_i$.

During a period of the cycle, it is possible to introduce from the outside of the column feedstock or desorbent into the second chambers of a plate $P_i$; it is possible to cancel out the flow of fluid from the bypass line that feeds said second chambers of said plate $P_i$, and it is possible to draw off a raffinate or an extract from the first chambers of plate $P_i$.

When the distributor plate comprises four distribution chambers per sector, a first that is intended to receive a draw-off of raffinate, a second that is intended to receive an introduction of feedstock, a third that is intended to receive a draw-off of extract, and a fourth that is intended to receive an introduction of desorbent, it is possible to draw off the fluid from the first chambers and the third chambers of a distributor plate $P_i$ to introduce it into, respectively, the second and fourth chambers of plate $P_i$.

In the case where the chambers of distributor plate $P_i$ are arranged one above the other, the fluid that circulates in the bypass line will advantageously flow in the same direction as the main fluid. In this embodiment, each chamber performs a single function, while in the case where there are only two chambers per sector, each of them performs multiple functions.

During a period of the cycle, it is possible to draw off raffinate from the first chambers of a plate $P_i$, and it is possible to cancel out the flow of fluid from the bypass line that feeds the second chambers of plate $P_i$.

During a period of the cycle, it is possible to draw off the extract from the third chambers of a distributor plate $P_i$, and it is possible to cancel out the flow of fluid from the bypass line that feeds the fourth chambers of plate $P_i$.

During a period of the cycle, it is possible to introduce desorbent from the outside of the column into the fourth chambers of a plate $P_i$, and it is possible to cancel out the flow of fluid from the bypass line that feeds the other chambers of plate $P_i$.

During a period of the cycle, it is possible to introduce feedstock from the outside of the column into the second chambers of a plate $P_i$, and it is possible to cancel out the flow of fluid from the bypass line that feeds the other chambers of said distributor plate.

Thus, according to a first variant, the first and third chambers are draw-off chambers, and the second and fourth chambers are chambers for introducing fluid that comes from said first and third chambers. In this version, the second chamber is one that is used only for recycling fluid, and the fourth is a chamber that is used only for the injection of fluid.

According to another variant, the first chamber is a chamber for drawing off a raffinate, the third chamber is a chamber for drawing off an extract, the second chamber is a chamber that is used only for recycling fluid that is obtained from said first chamber, and the fourth chamber is a chamber for recycling the fluid that is obtained from the third chamber during a period of the cycle and a chamber for introduction of feedstock or desorbent during other periods of the cycle.

Finally, according to an advantageous version, the first and the third chambers are chambers for drawing off a fluid either for the purpose of recirculating it into, respectively, the second and the fourth chamber or for the purpose of recovering, respectively, a raffinate and an extract. In this version, the second and fourth chambers are chambers for the introduction of a fluid that is either a recycling fluid that is obtained from, respectively, the first and the third chambers or for the introduction of, respectively, the feedstock and the desorbent.

The invention also relates to the device for the implementation of the process. More specifically, it relates to a device for chromatographic separation of a feedstock in a simulated moving bed that comprises at least one column that is filled with an adsorbent, whereby the column comprises a number of beds and a fluid distributor plate $P_i$ between each bed, whereby each distributor plate is divided into a number of sectors, each sector comprises at least two fluid distribution chambers ($CH_i$, $CH_j$) pierced with orifices and a fluid circulation space near said orifices of the chambers, all of chambers $CH_i$ of a plate and all of chambers $CH_j$ of the same plate are connected respectively to a transfer line $LT_i$ and to a transfer line $LT_j$ that extend between the chambers and a point that is located outside of the column, characterized in that transfer line LT, which is associated with distribution chambers $CH_i$ of a plate $P_i$, is connected by a bypass line ($L_{i,j}$) to transfer line $LT_j$, which is associated with other distribution chambers $CH_j$ of this same plate $P_i$, and in that the bypass line comprises means (15) for controlling and adjusting the flow of the fluid that circulates there.

According to a special embodiment, the device according to the invention usually comprises a bypass line that comprises means for controlling and adjusting the flow of fluid that circulates there. These means can be a calibrated line, as indicated above.

The means for controlling and adjusting the fluid flow can generally comprise a nonreturn valve or any other equivalent means. These means usually comprise a means of measuring the flow of fluid that circulates in the bypass line and a flow regulating valve, optionally slaved to the flow measuring means. The bypass line can further comprise a pump or a circulator that is generally arranged upstream from the flow measuring means that makes it possible to impose a circulation, so-called forced circulation, from first chambers $CH_i$ to second chambers $CH_j$, for example.

According to an embodiment of the device, each distributor plate $P_i$ of the column can comprise, per sector, three or four fluid distribution chambers and preferably four chambers. According to this embodiment that comprises four fluid distribution chambers, a first chamber in a preferred form is well suited for receiving a first fluid (raffinate), a second is well suited for receiving a second fluid (feedstock), a third is well suited for receiving a third fluid (extract) and a fourth is well suited for receiving a fourth fluid (desorbent). A first bypass line connects the first chambers of a plate $P_i$ to the second chambers of this same plate $P_i$, and a second bypass line connects the third chambers of a plate $P_i$ to the fourth chambers of this same plate $P_i$.

According to another form of this embodiment, a first chamber is well suited for drawing off a fluid (extract), a second chamber is well suited for receiving a fluid (recirculation of a fluid that is obtained from the first chamber), a third chamber is well suited for drawing off a fluid (raffinate), and a fourth chamber is well suited for receiving a fluid that can be a recirculation fluid that is obtained from the third chamber or the feedstock or the desorbent and in which a first bypass line connects the first chambers to the second chambers of same plate $P_i$ and a bypass line connects the third chambers to the fourth chambers of this same plate $P_i$.

According to another form of this embodiment, a first chamber is well suited for drawing off a fluid (extract or raffinate), a second chamber is well suited for receiving a fluid (recirculation of a fluid that is obtained from the first chamber), a third chamber is well suited for drawing off a fluid (so-called recirculation fluid) and a fourth chamber is well suited for receiving a fluid that can be a recirculation fluid that is obtained from the third chamber or the feedstock or the desorbent and in which a first bypass line connects the first chambers to the second chambers of same plate $P_i$ and a bypass line connects the third chambers to the fourth chambers of this same plate $P_i$.

The invention finally relates to the use of the device for the separation of paraxylene that is present in a mixture of aromatic compounds with eight carbon atoms and, for example, in a mixture of xylenes (ortho, meta, para).

BRIEF DESCRIPTION OF THE DRAWINGS

The invention will be better understood based on the figures, which diagrammatically illustrate the preferred embodiments of the device, where:

FIGS. 3a and 3b show a longitudinal section of a column where each distributor comprises, per sector, two distribution chambers either opposite (FIG. 3a) or one above the other (FIG. 3b), FIGS. 4a, 4b, 4c depict a longitudinal section of a column where each distributor comprises, per sector, four distribution chambers, whereby chambers 1 and 2 are connected to one another via a bypass line, and chambers 3 and 4 are connected to one another via a bypass line.

DETAILED DESCRIPTION OF THE DRAWINGS

Figure 1:
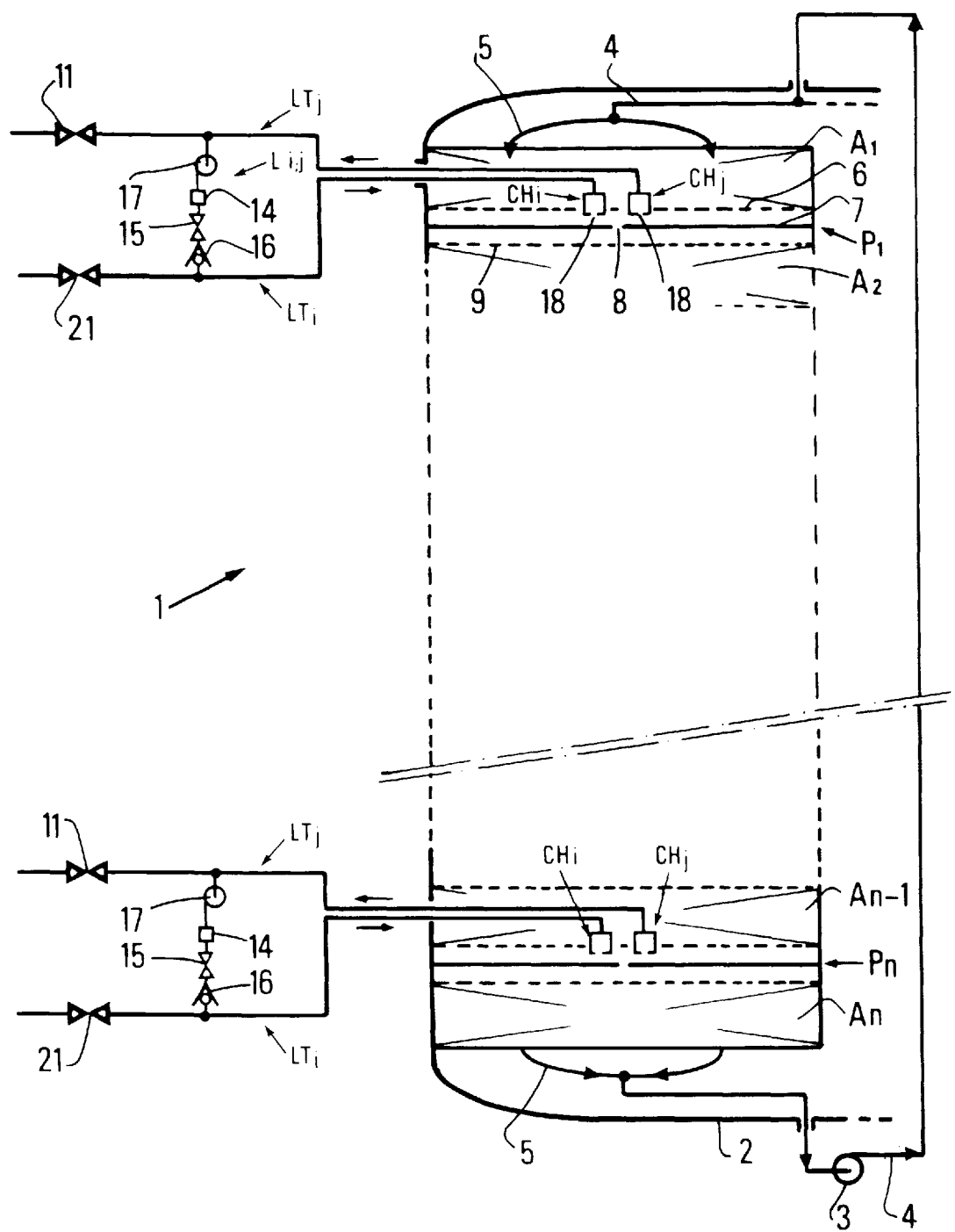
FIG. 1 shows at the level of a sector a longitudinal section of an adsorbent column, with two distribution chambers per sector, that comprises bypass lines for controlled flow according to the invention.

FIG. 1 shows a cylindrical chromatographic column 1 that contains a number of beds $A_n$ of an adsorbent, with zeolitic molecular sieve BaX, for example. Main fluid is drawn off from the lower end of the column via line 2 to be recycled via a pump 3 and a line 4 to the upper end of this column, where it is introduced into upper adsorbent bed $A_1$ via lines 5.

To separate paraxylene from a feedstock of aromatic compounds with eight carbon atoms that contain it, there are generally two columns of twelve beds each, whereby the twenty-four beds are divided into at least four zones, and each zone is delimited by an injection of a secondary fluid that is obtained from the outside of the column (desorbent or feedstock, for example) and a draw-off of another secondary fluid (extract or raffinate, for example). For example, five beds are reserved for zone I, 9 beds for zone II, 7 beds for zone III, and 3 beds for zone IV. Under bed $A_1$ is located distributor plate $P_1$ for fluid that is to pass through the next bed.

Figure 2:
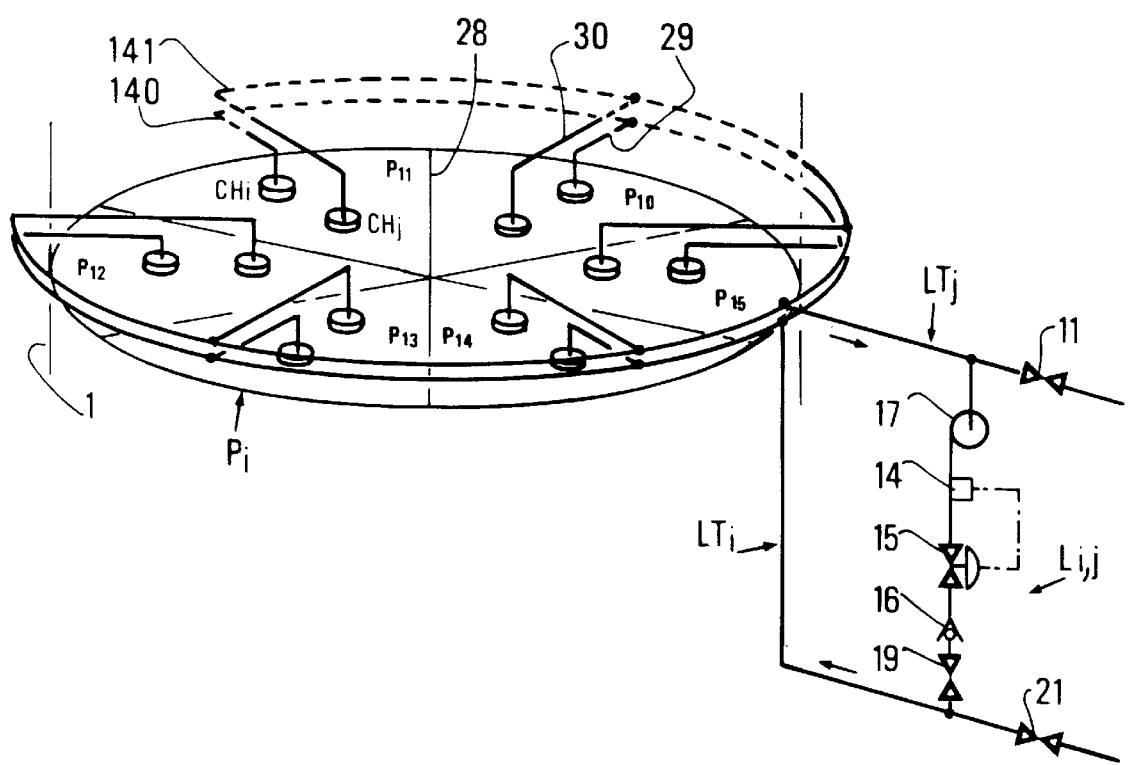
FIG. 2 illustrates a plate that is divided into sectors, whereby each sector comprises two chambers, a first series of chambers is fed by a common line and the second series is fed by a separate common line, whereby said common lines are connected to one another via the bypass line according to the invention.

Each distributor plate $P_i$ according to FIG. 2 is divided into sectors of plates $P_{10}$, $P_{11}$, $P_{12}$, $P_{13}$, $P_{14}$, and $P_{15}$ that are delimited by walls 28 that are either radial, as indicated in the figure, or approximately parallel to a diameter of the column. Each sector comprises two fluid distribution chambers $CH_i$ and $CH_j$ which have a longitudinal shape either for the introduction of secondary fluid or for the draw-off of secondary fluid as indicated below, and each chamber is connected via a line 29 to a line 140 for the chambers that are designated $CH_i$ and via a line 30 to a line 141 for the chambers that are designated $CH_j$. Each of these lines that are located inside or outside of the column recovers the fluids from all of the chambers to which it is connected, and they are each connected to a secondary fluid transfer line $LT_i$ and $LT_j$ that is specific to them.

Each distributor plate $P_i$ is located between two adsorbent beds. Each plate sector $P_{10}$ to $P_{15}$ that is diagrammatically shown in angular form in FIG. 1 comprises an upper grid 6 that supports upper adsorbent bed A1 which is approximately perpendicular to the axis of the column and makes it possible for fluid from bed $A_1$ to flow and to be collected. It further comprises two flat non-perforated deflectors 7 that are arranged on the same horizontal plane, between which a space 8 is arranged for circulation of the fluid. A lower grid 9 under deflectors 7 makes it possible to disperse the fluid uniformly in lower adsorbent bed $A_2$.

At each distributor plate $P_i$, secondary fluid transfer lines $LT_i$ and $LT_j$ are connected to at least four secondary fluid transfer lines that are not shown in FIG. 1 (feedstock injection line 100, desorbent injection line 110, extract draw-off line 210, and raffinate draw-off line 200 which are shown in, for example, FIG. 3a) that each comprise a sequence valve that is shown symbolically by valves 11a, 11b, 21a and 21b, for example, in FIG. 3a. The valves can be replaced by a rotary valve. Of course, three-way valves can be used, for example, to introduce the feedstock or the desorbent and thus to reduce the dead volumes. All of said valves are connected to sequential switching means that are well suited for periodically advancing each secondary fluid injection point or secondary fluid draw-off of a bed in the direction of circulation of the main fluid, i.e., from top to bottom. A simulated moving bed that operates in counter-current is thus provided.

Each chamber $CH_i$ and $CH_j$ (for example $CH_1$, $CH_2$, $CH_3$, $CH_4$ in FIG. 4a) for secondary fluid distribution comprises orifices 18 that are advantageously arranged above circulation space 8, through which the secondary fluid flows to be either introduced into the next bed after being mixed with the main fluid that has passed through the preceding bed or to be drawn off by the appropriate transfer line.

Distribution chambers $CH_i$ of plate $P_i$ are connected to distribution chambers $CH_j$ of distributor plate $P_i$ via a bypass line $L_{i,j}$. The fluid volume that passes through chambers $CH_i$, the portion of transfer line $LT_i$ to the bypass line, bypass line $L_{i,j}$, the portion of transfer line $LT_j$ that communicates with distribution chambers $CH_j$, as well as said chambers $CH_j$ are known for the calculation of the circulation flow rate in line $L_{i,j}$. Each bypass line ($L_{i,j}$) comprises (according to the embodiment that is illustrated in FIG. 2) a flowmeter 14, a flow control valve 15 that is slaved to the flowmeter, and a downstream nonreturn valve 16 that is well suited just for circulating the fluid from chambers $CH_j$ to chambers $CH_i$. A pump or a circulator 17 makes it possible to circulate the fluid from chambers $CH_j$ to chambers $CH_i$. An all-or-none valve 19 can prevent any circulation in the bypass line.

A direction of circulation of fluids from chambers $CH_i$ to chambers $CH_j$ could have been shown by modifying the arrangement of elements 14, 15, 16, 17 on bypass line $L_{i,j}$.

The device with two distribution chambers per distributor plate sector operates according to FIG. 2 in the following way: during the draw-off period of an extract via line $LT_j$, valve 21 is opened, the extract is drawn off via chambers $CH_j$ of plate $P_i$, and nonreturn valve 16 prevents any circulation of the fluid in circulation line $L_{i,j}$. The procedure would be the same for the draw-off of the raffinate on plate $P_i$ during the cycle.

During the feedstock injection period during the cycle, the feedstock is introduced into plate $P_i$ via distribution chambers $CH_j$ and feedstock transfer line $LT_i$, whereby valve 11 is open and valve 21 is closed; the flow from the bypass line is canceled out by the nonreturn valve. The procedure would be the same for the introduction of desorbent into plates $P_i$ during the cycle.

In plate $P_i$, which receives no secondary fluid (no feedstock or desorbent injection, or draw-off of extract or raffinate), valves 11, 21 on transfer lines $LT_i$ and $LT_j$ are closed, and the main fluid, which is obtained from bed $A_1$, is collected in deflectors 7 and flows through circulation space 8. A portion circulates through the orifices of chambers $CH_j$ of plate $P_i$, flushes chambers $CH_j$, transfer lines 30, line 141, transfer line $LT_j$, and bypass line $L_{i,j}$ m and reaches line $LT_i$ for transfer of the fluid under controlled flow via flowmeter 14 and valve 15 that is slaved to the flowmeter (according to the embodiment that is illustrated in FIGS. 1 and 2), which communicates with chambers $CH_i$ via line 140 and transfer lines 29.

FIGS. 3a and 3b illustrate a sector $P_{10}$ of a distributor plate $P_i$ that comprises two chambers CH1, CH2 for distribution of a fluid, whereby said chambers also act as fluid deflectors, with the same references for the same means as those of FIGS. 1 and 2. Their orifices according to the embodiment that is illustrated in FIG. 3a face one another at space 8. First chambers CH1 are well suited for drawing off a first fluid, and second chambers CH2 are well suited for receiving a second fluid. Lines 200 and 210, which are controlled respectively by valves 21a and 21b, make it possible to draw off, respectively, the raffinate and the extract, from transfer line $LT_j$, at the outlet of chambers CH1. The connecting lines of all of first chambers CH1 of same distribution plate $P_i$ are connected to transfer line $LT_j$ of a fluid. This transfer line $LT_j$ of plate $P_i$ communicates with transfer line $LT_i$ of plate $P_i$ via bypass line $L_{i,j}$ that comprises means 14, 15, 16, and optionally 17 that are mentioned in the description of FIGS. 1 and 2. Transfer line $LT_i$ is connected to all of second chambers CH2. Lines 100 and 110, which are controlled by valves 11a and 11b respectively, introduce the feedstock or the desorbent in transfer line LTi to chambers CH2.

During the period of the cycle where the introduction of desorbent or feedstock is carried out, feedstock is introduced from the outside of the column, for example, into chambers CH2 of a plate $P_i$, whereby valve 11a is open. During the period of the cycle where a fluid is drawn off from chambers CH1 of plate $P_i$ that is introduced into chambers CH2 of plate $P_i$ via bypass line $L_{i,j}$, valves 11a and 11b are closed.

During the period of the cycle where the draw-off of an extract or a raffinate is carried out, the extract is drawn off from, for example, the column in chambers CH1 of a plate $P_i$, whereby valve 21b is open. In the two cases (introduction or draw-off) that are mentioned, the flow rate of fluid that circulates in the bypass line can be maintained. The case is shown (FIG. 3b) where, contrary to an arrangement of horizontal chambers CH1 and CH2, chambers CH1 and CH2 are arranged one on top of the other.

FIG. 3b illustrates another advantageous embodiment that can make it unnecessary to use a pump for the transfer of the fluid from chambers CH1 to chambers CH2. Actually, chambers CH1 are located above chambers CH2, and a restriction of section 18a at the common wall of the two chambers in circulation space 8 makes it possible to create enough of a pressure difference to create a natural circulation from chambers CH1 to chambers CH2.

FIGS. 4 illustrate a fluid distributor plate $P_i$ with four independent chambers CH1, CH2, CH3, and CH4 per sector that also play the role of fluid deflector. The same means of FIGS. 1 and 2 have the same functions and the same references. Outside of the recovery periods of raffinate or extract, chambers CH1 are connected via transfer lines $LT_{j1}$ and $LT_{j2}$ and the bypass line that comprises means 14, 15, 16 and 17 that are described above in chambers CH2, and the fluid that is extracted from chambers CH1 is introduced into chambers CH2. Outside of the feedstock or desorbent introduction periods, chambers CH3 are connected via transfer lines $LT_{i1}$ and $LT_{i2}$ that comprise means 14, 15, 16, and 17 that are described above in chambers CH4, and the fluid that is extracted from chambers CH3 is introduced into chambers CH4.

According to the variant that is shown in FIG. 4a, chambers CH1 are well suited for recovering the raffinate or the extract, respectively, via lines 200 and 210. They are connected to valve 21a or 21b via transfer line $LT_{j1}$.

According to the variant that is shown in FIG. 4b, chambers CH1 are well suited for recovering the extract via line 210. They are connected to valve 21b via transfer line $LT_{j1}$. Chambers CH3 are well suited for recovering the raffinate via line 200. They are connected to valve 21a via transfer line $LT_{i1}$.

According to the variants that are shown in FIGS. 4a and 4b, chambers CH4 are well suited for receiving the introduction of the feedstock or desorbent, respectively, via lines 100 and 110, which are connected to transfer line $LT_{i2}$ that comprises valves 11a and 11b.

According to the variant that is shown in FIG. 4c, each chamber has a special function. Chambers CH1 are well suited for recovering the raffinate, chambers CH2 are well suited for the introduction of the feedstock, chambers CH3 are well suited for recovering extract, and chambers CH4 are well suited for the introduction of desorbent.

What is claimed is:

1. A device suitable for chromatographic separation by a simulated moving bed of a feedstock, said device comprising at least one column (1) that is filled with an adsorbent, whereby the column comprises a number of beds ($A_n$) and a fluid distributor plate $P_i$ between each bed, each distributor plate is divided into a number of sectors, and each sector comprises at least two fluid distribution chambers ($CH_i$, $CH_j$) that are pierced with orifices (18) and a fluid circulation space (8) near said orifices of the chambers, all of chambers $CH_i$ of a plate and all of chambers $CH_j$ of the same plate are connected respectively to a transfer line $LT_i$ and a transfer line $LT_j$ that extend between the chambers and a point that is located outside of the column, wherein transfer line $LT_i$, which is associated with distribution chambers $CH_i$ of a plate Pi, is connected via a bypass line $L_{i,j}$ to transfer line $LT_j$, which is associated with other distribution chambers $CH_j$ of this same plate Pi, and wherein the bypass line comprises means (15) for controlling and adjusting the flow of the fluid that circulates there.

2. A device according to claim 1, wherein the bypass line comprises a nonreturn valve (16).

3. A device according to claim 2, wherein said flow control and adjustment means comprise a means (14) for measuring flow and a flow regulating valve (15) that is optionally slaved to the flow measurement means.

4. A device according to claim 3, wherein the bypass line comprises a pump (17).

5. A device according to claim 4, wherein each distribution plate sector $P_i$ comprises three or four chambers.

6. A device according to claim 1 or 2, wherein said flow control and adjustment means comprise a means (14) for measuring flow and a flow regulating valve (15) that is optionally slaved to the flow measurement means.

7. A device according to claim 6, wherein each distribution plate sector $P_i$ comprises three or four chambers.

8. A device according to one of claim 1, wherein the bypass line comprises a pump (17).

9. A device according to one of claim 1, wherein each distribution plate sector $P_i$ comprises three or four chambers.

10. A device according to claim 9, wherein each distributor plate sector $P_i$ comprises (FIG. 4c) four fluid distribution chambers, a first that is well suited for drawing off a first fluid (raffinate), a second that is well suited for receiving a second fluid (feedstock), a third that is well suited for drawing off a third fluid (extract), and a fourth that is well suited for receiving a fourth fluid (desorbent) and wherein a first bypass line connects the first chambers to the second chambers and a second bypass line connects the third chambers to the fourth chambers.

11. A device according to claim 9, wherein each distributor plate sector $P_i$ comprises (FIG. 4b) four fluid distribution chambers, a first that is well suited for drawing off a first fluid (extract), a second that is well suited for receiving a second fluid that is obtained from the first chamber, a third that is well suited for drawing off a third fluid (raffinate), and a fourth that is well suited for receiving a fourth fluid (feedstock or desorbent or a fluid that is obtained from the third chamber) and wherein a first bypass line connects the first chambers to the second chambers and a second bypass line connects the third chambers to the fourth chambers.

12. A device according to claim 9, wherein each distributor plate sector $P_i$ comprises (FIG. 4a) four fluid distribution chambers, a first that is well suited for drawing off a first fluid (extract or raffinate), a second that is well suited for receiving a second fluid that is obtained from the first chamber, a third that is well suited for drawing off a third fluid that is called recirculation fluid, and a fourth that is well suited for receiving a fourth fluid (feedstock or desorbent or recirculation fluid) and wherein a first bypass line connects the first chambers to the second chambers, and a second bypass line connects the third chambers to the fourth chambers.

* * * * *